United States Patent [19]

Creagan et al.

[11] 4,061,536
[45] Dec. 6, 1977

[54] FUEL ASSEMBLY FOR NUCLEAR REACTORS

[75] Inventors: Robert J. Creagan, Pitcairn; Erling Frisch, Pittsburgh, both of Pa.

[73] Assignee: The United States of America as represented by the United States Energy Research and Development Administration, Washington, D.C.

[21] Appl. No.: 304,292

[22] Filed: Nov. 6, 1972

Related U.S. Application Data

[63] Continuation of Ser. No. 721,122, April 12, 1968, abandoned, which is a continuation of Ser. No. 552,976, May 25, 1966, abandoned.

[51] Int. Cl.$^2$ .............................................. G21C 3/34
[52] U.S. Cl. ...................................................... 176/78
[58] Field of Search ................... 176/76, 78, 86 R, 87

[56] References Cited

U.S. PATENT DOCUMENTS

| | | | |
|---|---|---|---|
| 3,068,163 | 12/1962 | Currier et al. | 176/78 |
| 3,072,549 | 1/1963 | Koutz et al. | 176/86 R |
| 3,255,091 | 6/1966 | Frisch | 176/78 |
| 3,287,231 | 11/1966 | Frisch | 176/78 |

OTHER PUBLICATIONS

WCAP-2385 (vol. 1, 2. Alternate Core Design No. 2), 1000 MWE Closed Cycle Water Reactor Study, Mar. 1963
Presentation to AEC and ACRS of an Improved Control Rod Absorber June 5, 1963.

*Primary Examiner*—Stephen C. Bentley
*Attorney, Agent, or Firm*—Zigmund L. Dermer; James R. Campbell

[57] ABSTRACT

A new and improved fuel assembly is formed to minimize the amount of parasitic structural material wherein a plurality of hollow tubular members are juxtaposed to the fuel elements of the assembly. The tubular members may serve as guide tubes for control elements and are secured to a number of longitudinally spaced grid members along the fuel assembly. The grid members include means thereon engaging each of the fuel elements to laterally position the fuel elements in a predetermined array. Openings in the bottom of each hollow member serve as a shock absorber to cushion shock transmitted to the structure when the control elements are rapidly inserted in their corresponding tubular members.

2 Claims, 5 Drawing Figures

INVENTORS
Robert J. Creagan &
Erling Frisch.
BY
A. J. Santantonio
ATTORNEY

FUEL ASSEMBLY FOR NUCLEAR REACTORS

This is a continuation, of application Ser. No. 721,122 filed Apr. 12, 1968 which is a continuation of Ser. No. 552,976 filed May 25, 1966 both now abandoned.

The present invention relates to a fuel assembly for a nuclear reactor and, more particularly, to a fuel assembly which minimizes the amount of parasitic structural material therein, yet provides a rigid support means for the fuel elements, together with the ability to accommodate other necessary functions of a fuel assembly.

The reactivity and, in turn, the power output of a nuclear reactor is limited by the amount of structural material in the reactor core, as the structural material parasitically absorbs neutrons which could otherwise be used in the fission process. One general structural form commonly used for providing a nuclear fuel inventory in nuclear reactors is that in which a plurality of elongated nuclear fuel elements or rods containing the nuclear fuel material are arranged, within a prescribed volume, in a parallel array in an upstanding direction between the upper and lower reactor core plates. To provide integrity in the support relations, the fuel rods are divided into groups; and the rods in each group are formed as a fuel assembly prior to placement between the reactor core plates. A fluid, having coolant and, if desired, neutron moderating properties, flows longitudinally along and among the fuel rods as a vehicle for energy transfer.

Since the fuel assembly became longer with the development of larger nuclear reactors, a can enclosing the fuel rods was used for structural support of the latter. The can, however, has the effect of poisons within the critical region of the reactor core, because the can absorbed neutrons. Furthermore, structural material, such as the above mentioned can, increases the pressure drop through the reactor core, allows by pass coolant flow between cans thereby reducing the effective heat transfer within the reactor core, provides an unheated surface which also may influence the heat transfer within the reactor core, requires a greater spacing between fuel rods of adjacent fuel assemblies than the spacing between fuel rods within the same fuel assembly, and restricts lateral coolant flow mixing between the fuel assemblies of the reactor core. In addition, the can to some extent increases the weight of the fuel assembly, necessitating a heavier core support structure as a considerable number of fuel assemblies are utilized in a reactor core.

Accordingly, it is the general object of this invention to provide a new and improved nuclear fuel assembly.

Another general object of this invention is to provide a fuel assembly which serves to increase the power output of a reactor core.

Another object of this invention is to provide a fuel assembly which contains a minimum of parasitic structural material.

Still another object of this invention is to provide a simplified structure for supporting the fuel rods in the fuel assembly.

A further object of this invention is to provide a fuel element assembly which accomplishes other necessary functions of a fuel assembly in addition to its function of supporting a plurality of fuel elements.

A still further object of this invention is to provide a fuel assembly which serves to reduce the pressure drop through the reactor core.

Yet another object of this invention is to provide a fuel assembly which permits the same spacing between fuel elements of adjacent fuel assemblies as the spacing between fuel elements within the fuel assembly so that the reactor core approaches complete homogeneity.

A still further object of this invention is to provide a fuel assembly wherein the fuel elements add to the overall stiffness of the fuel assembly.

Briefly, the present invention accomplishes the above cited objects by providing an elongated support means in the fuel assembly to vertically support the fuel elements or rods and also to position a plurality of longitudinally spaced grids which extend across and are secured to the elongated support means. The support means comprises a plurality of parallel elongated members or thimbles which also serve as guide tubes for the control rods and are interspersed among and parallel to the fuel rods to extend through the grids. In addition, perforated end plates are secured to the outer end portions of the thimbles. The fuel rods, in turn, extend substantially from one end plate to the other end plate in a parallel array through the remaining openings in the grids and are vertically supported by the bottom end portion of the support means. Each grid has means for laterally positioning the fuel rods and also may have mixing vanes for laterally mixing the longitudinally flowing coolant.

More specifically, the nuclear fuel assembly comprises an open elongated support means, a plurality of grids and a plurality of parallel fuel rods. The elongated support means, in turn, comprises a plurality of laterally spaced control rod guide tubes or thimbles having their end portions secured to the transverse perforated end plates. The longitudinally spaced grids extend transversely of and are secured to the thimbles thereby adding rigidity to the entire support means. The fuel rods extend through the grid openings in a parallel array, with the thimbles being parallel to and interspersed among the fuel rods. The fuel rods are disposed between the end plates and are vertically supported by the bottom end plates. The openings in the grid member are formed by a plurality of straps, which are interfitted to provide a structural network, similar to an "egg crate." The grid straps, in turn, are provided with at least resilient means for laterally engaging and positioning the fuel rods. Furthermore, the overall stiffness of the fuel assembly is increased when the fuel rods are in place because of the friction generated between the fuel rods and the lateral supporting means on the grid. The grids can also be further provided with mixing vanes which protrude into adjacent flow channels to laterally deflect the longitudinal coolant flow. In this embodiment the thimbles can also be used for instrumentation purposes, irradiation of materials or for receiving and guiding neutron absorbing control rods. Also, coolant cross flow between fuel assemblies is now freely possible, because the elongated transversely spaced thimbles are utilized to give ridigity to the fuel assembly in lieu of elongated enclosures or cans which completely surround the fuel rods contained within a single fuel assembly. The absence of the outer peripheral can also permits closer spacing between peripheral fuel rods of adjacent assemblies.

These and other objects and advantages of the present invention will become more apparent when considered in view of the following detailed description and drawings, in which:

FIG. 3 primarily shows an outline form in plan view of a mixing vane grid with upper mixing vanes illustrated but with lower mixing vanes omitted;

Figure 1:
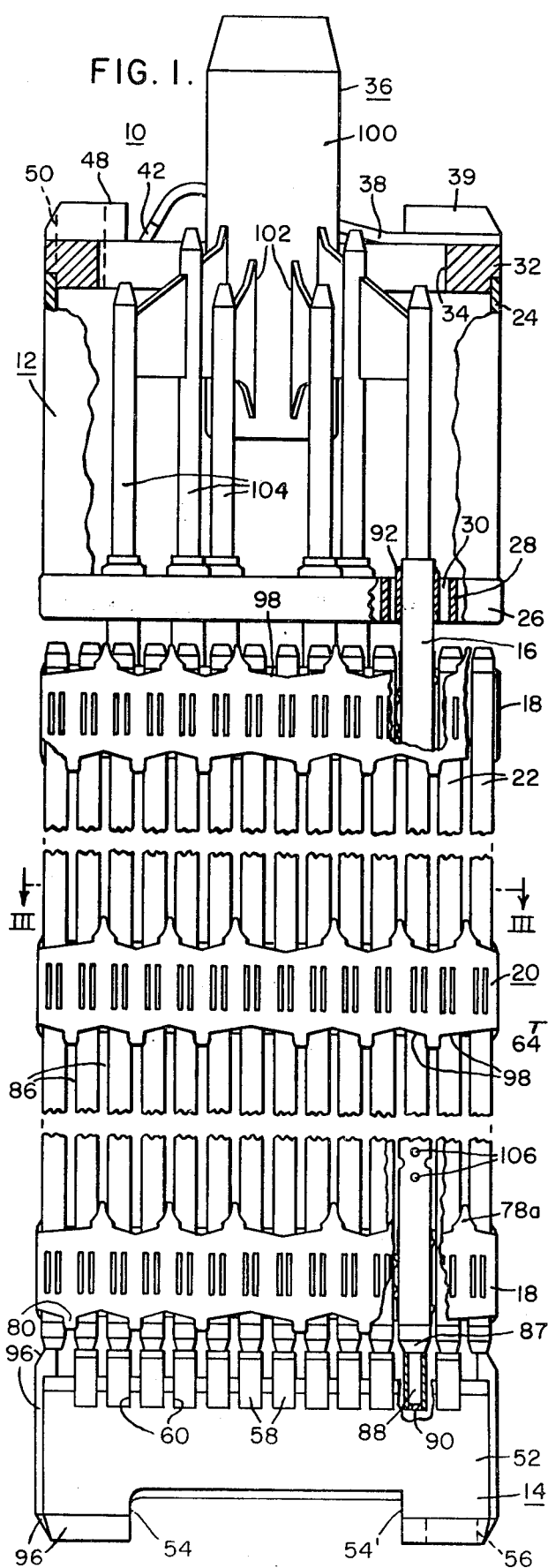
FIG. 1 is a partially sectioned elevational view, with parts broken away for clarity, of a fuel assembly formed in accordance with the principles of this invention.
Figure 2:
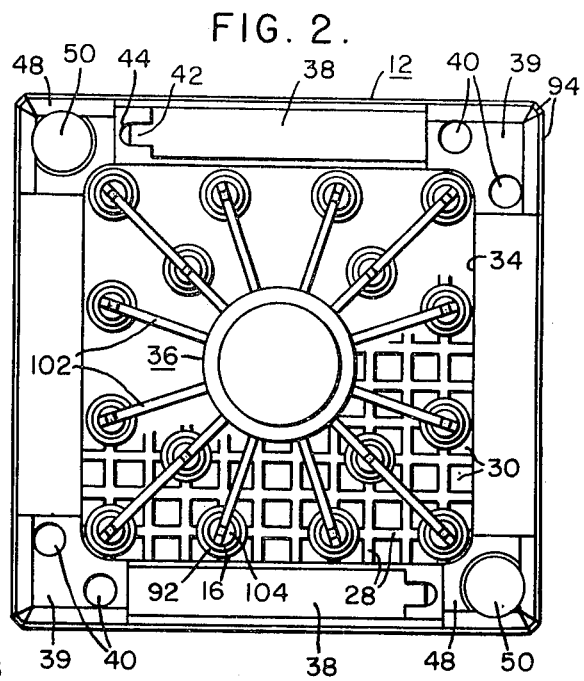
FIG. 2 is a plan view of FIG. 1.

Referring now to FIGS. 1 and 2 of the drawings, there is shown a fuel assembly 10 comprising an upper end structure 12, a lower end structure 14, a plurality of elongated support means or thimbles 16, a plurality of positioning grids 18, at least one positioning grid 20 having mixing vanes formed thereon, and a plurality of fuel elements or rods 22. To form fuel assembly 10, the longitudinally spaced grids 18 and 20 are first secured to the elongated support thimbles 16; and lower end structure 14 is then secured to the lower end portions of the thimbles, the fuel rods 22 then are inserted through the grids 18 and 20 from above and are vertically supported by the lower end structure 14; and then the upper end structure is secured to the top end portions of thimbles 16.

Turning now to a description of each of the above mentioned individual components, the upper end structure 12 has a longitudinally disposed and rectangularly shaped upper end nozzle 24. An upper end plate 26, having a plurality of cross laced bars 28 which form openings 30, is secured to the bottom of the end nozzle 24. An annular flange 32 is secured to the top of the end nozzle 24. Flange 32 has an opening 34, which is sufficiently large to permit a rod cluster control assembly 36, to be described hereinafter, to pass through the opening 34 in a vertical direction. Two oppositely disposed leaf springs 38 are secured to the upper face of flange 32 by corner blocks 39 and screws 40. Each leaf spring 38 has a narrow end portion 42, which extends through a guide slot 44. Two other corner blocks 48 are diagonally disposed from each other and welded to the top surface of flange 32. Each block 48 has an opening 50, which extends through both the block 48 and the flange 32. Each opening 50 receives a dowel pin (not shown), which extends downwardly from an upper reactor core plate (not shown). After both the fuel assembly 10 and the upper core plate (not shown) have been inserted into their final position within the reactor core (not shown) the upper core plate is spacedly disposed from the upper surfaces of corner blocks 39 and 48 to allow for longitudinal expansion of the fuel assembly 10. In addition, the dowel pins (not shown) on the upper core plate extend downwardly into the openings 50 to provide lateral support for the fuel assembly 10. The upper core plate also deflects leaf springs 38 so as to preload the fuel assembly 10 sufficiently to prevent the fuel assembly from being moved upwardly by the hydraulic forces produced by an upwardly flowing coolant.

The lower end structure 14 has a longitudinally disposed and rectangularly shaped lower end nozzle 52, and the lower end nozzle 52 has four corner downwardly extending supports 54. Supports 54 are shaped similarly to the previously described blocks 39 and 48. Each of two diagonally disposed supports 54' has an opening 56 extending therethrough. The two openings 56 are longitudinally aligned with openings 50 located at the top of the fuel assembly 10. When the fuel assembly 10 is inserted into its reactor core (not shown), the four supports 54 rest on the lower core plate (not shown); and openings 56 received dowel pins (not shown) which extend upwardly from the lower core plate. Transverse bars 58 extend across the upper portion of the lower end nozzle 52, and the two end portions of each bar 58 are fitted into respective recesses 60 formed in the two oppositely disposed walls of the end nozzle 52 and are secured thereto.

Figure 3:
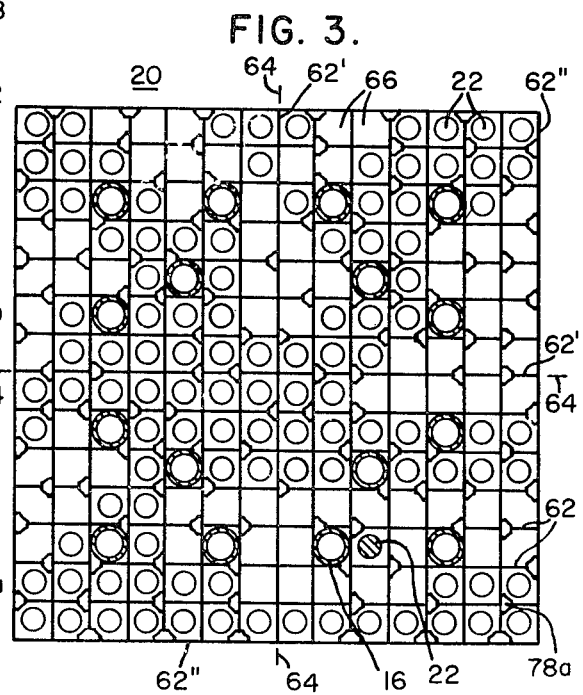
FIG. 3 is a partially cross sectioned view taken along reference line III—III of FIG. 1 with parts removed for clarity.
Figure 4:
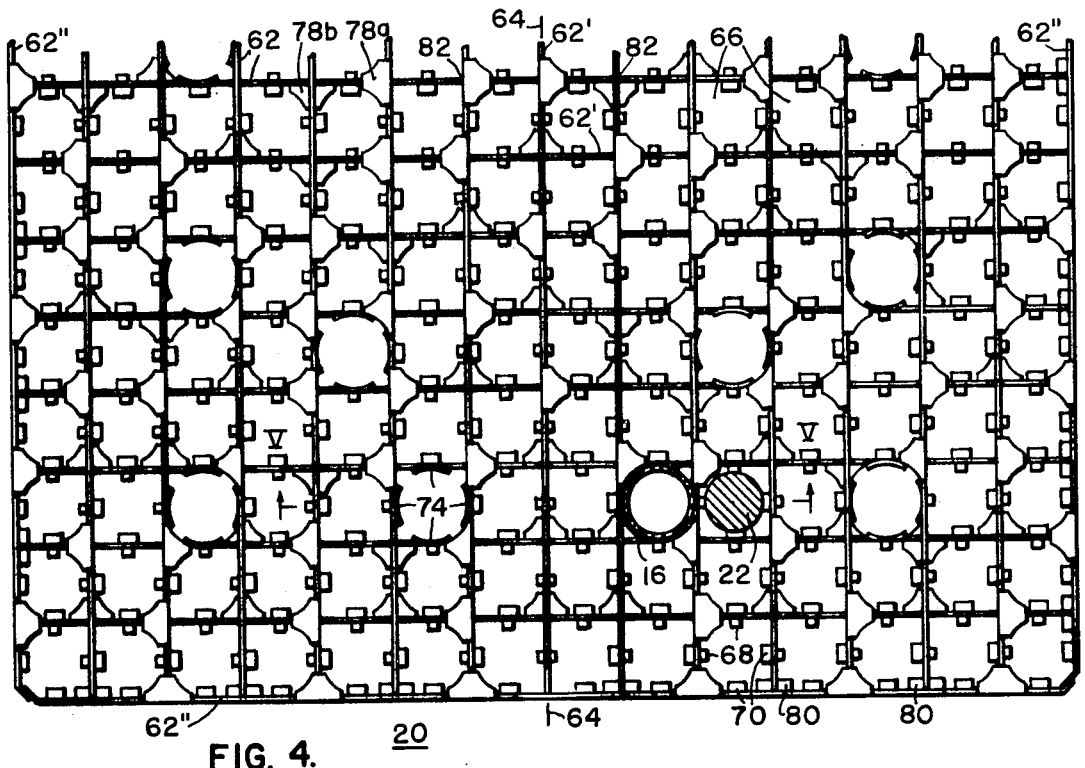
FIG. 4 is an enlarged portion of and is more detailed than FIG. 3, with some of the same parts being cross sectioned in both figures for orientation purposes.
Figure 5:
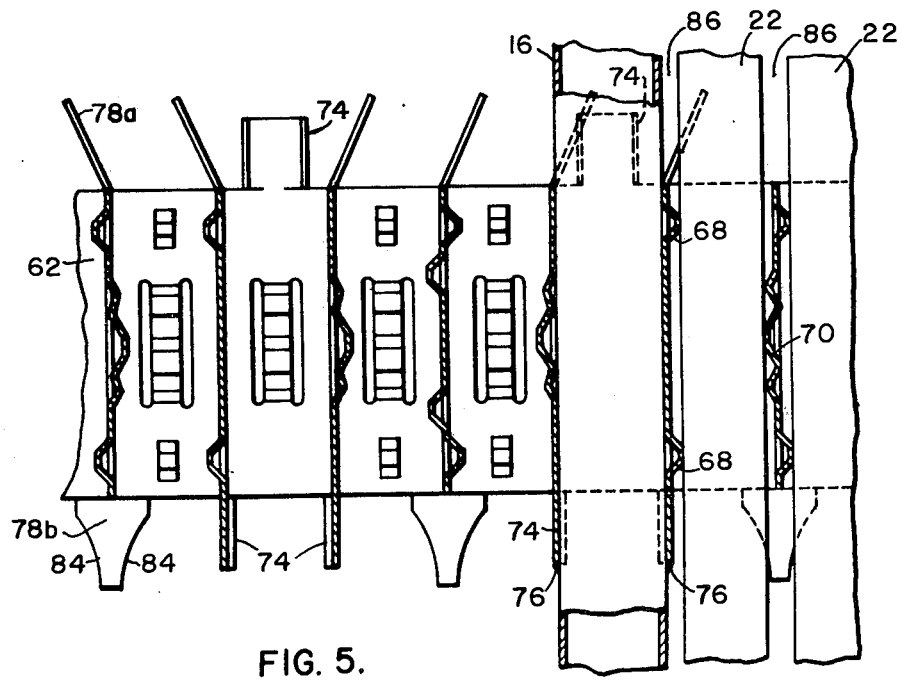
FIG. 5 is an enlarged partially sectioned elevational view of a portion of FIG. 4 and is taken along reference line V—V.

As viewed in FIGS. 1, 3, 4 and 5, the fuel assembly 10 includes two types of positioning grids designated by the reference characters 18 and 20. The positioning grids 18 in this example comprise the two lowermost grids and the uppermost grids of fuel assembly 10 and differ from the remaining positioning grids 20 in that the positioning grids 20 include mixing vanes formed thereon (as will be described) while the positioning grids 18 do not include mixing vanes thereon. It will be appreciated that the particular form of the mixing vane grids 20 described herein do not form a part of this invention and are described more particularly in the application of Andrews and Vespa, Ser. No. 552,900 filed May 25, 1966, now U.S. Pat. No. 3,379,619 and entitled "Fuel Assembly for Nuclear Reactors" and assigned to the same assignee as the present invention. Each positioning grid 20 is comprised of a plurality of straps 62 which are interwoven in a grid-like manner. In FIGS. 3 and 4 ticks 64 or straps 62' indicate the center lines of the mixing vane and positioning grid 20 and have been so designated for orientation purposes. The straps 62, which are interfitted to provide a structural network similar to an "egg crate," form a plurality of openings 66. The grid straps 62 are also provided with rigid and resilient means formed integrally therein and projecting into each opening 66 through which a fuel rod 22 passes. The rigid and resilient means support the fuel rods 22 against lateral displacement and, to a given extent, frictionally against longitudinal movement. The rigid means comprise two longitudinally spaced rigid projections 68 which engage the fuel rod on one side. The resilient means comprises a spring finger 70, which engages the fuel rod 22 on the side directly opposite to the rigid projections at a longitudinal point preferably midway between the rigid projections 68. Another identical set of lateral supports are formed in the other two straps, which form the opening 66, so as to support the fuel rods 22 at the same longitudinal location, but substantially perpendicular to the first set of lateral supports. Thus, a six point lateral support is provided for each fuel rod 22 at each opening 66 through which the fuel rod passes. For additional information on the six point lateral supporting grid, reference is made to copending application Ser. No. 458,634 entitled "Means For Supporting Fuel Elements In A Nuclear Reactor," filed May 25, 1965 by Harry N. Andrews and Herbert W. Keller and also assigned to the present assignee.

The mixing vane and positioning grid 20 also provides openings 66 through which the thimbles 16 extend snugly against the walls of straps 62. Four arcuate tabs 74 extend longitudinally from the edges of the straps 62 adjacent to the thimbles 16 and are form fitted to the periphery of the thimble. Two oppositely disposed tabs 74 extend upwardly from the grid straps 62, and two oppositely disposed tabs 74 extend downwardly from the straps 62. However, the top pair of tabs 74 are laterally disposed 90° apart from the lower pair of tabs 74. The thimbles 16 are secured to each tab 74 by a suitable means such as welds 76. In addition, each strap 62 of grids 20 has a plurality of upper and lower cantilevered mixing vanes 78a and 78b, respectively. Each of the mixing vanes 78 extend longitudinally outwardly from the edges of its associated strap 62 and also in the same vertical plane as that of strap 62. Each vane 78 is also deflected at an angle of approximately 20° to 40° and preferably 28° to 30°, from the vertical plane of its associated straps 62. Each vane 78 is located at an intersection 82 of two straps 62, and each vane 78 has two arcuate portions 84 at its outer end to allow for the passage of adjacent fuel rods 22 through the mixing vane grid 20 without interfering with the mixing vane 78. However, the lower peripheral vanes 80 located on the peripheral straps 62" are more stubby in shape than mixing vanes 78, because the latter are used primarily for guiding purposes, to be described hereinafter. All vanes 78a and 80 on the peripheral straps 62" are bent towards the center of grid member 20 to prevent any protrusions outwardly of the peripheral straps 62". All of the other upper mixing vanes 78a are disposed on a first group of parallel straps 62, while all of the lower mixing vanes 78b are disposed on a second group of parallel straps 62 which are perpendicular to the first group. It is also to be noted that none of the upper mixing vanes 78a are located above any of the lower mixing vanes 78b or lower peripheral vanes 80. This is to prevent the need for splitting the mixing vane into two parts in order to achieve the interfitting of the cross laced straps 62, as the straps 62 are interfitted through the use of opposing slots (not shown) which allow the straps 62 to be interlatched at their various intersections.

As pointed out above, positioning grid 18 is substantially the same as mixing vane and positioning grid member 20, with all of the mixing vanes 78 removed with the exception of the upper mixing vanes 78a on the peripheral straps 62" and the lower peripheral vanes 80. The upper mixing vanes 78a and the lower peripheral vanes 80 are left on the positioning grid 18 to serve as guide means during the insertion of the fuel assembly 10 into the reactor core (not shown). Returning now to FIGS. 1 and 2, the positioning grid 18 is used for laterally positioning the fuel rods 22, while the positioning grid 20 is used both for laterally positioning the fuel elements 22 and also for the purpose of forcing a lateral flow of coolant between adjacent fuel elements 22 of each fuel assembly and between the fuel elements of adjacent assemblies thereby inducing coolant flow mixing between adjacent flow channels 86.

In assembling the fuel assembly 10, a plurality of longitudinally spaced grids 18 and 20 are secured to the parallel array of thimbles 16, which have been interspersed across the grids as shown in FIG. 3. In this embodiment, the grids 18 and 20 are located on a longitudinal pitch of approximately 11 inches, with a total of nine grids being used. Although all nine grids can be either positioning grids 18 or mixing vane and positioning grids 20, in this embodiment three positioning grids 18 and six mixing vane grids 20 have been used, with the two lowermost grids and one uppermost grid being positioning grids 18. Mixing vane grids 20 were not used in lieu of the two lowermost positioning grids 18, because the coolant has a relatively low temperature in the lowermost region and does not require lateral mixing. The mixing vane grid 20 was not used at the upper portions of the fuel rods 22, because the coolant is reaching the end of its longitudinal travel through the fuel assembly 10 and does not have an appreciable temperature rise in the upper portion of the fuel assembly 10. Therefore, there is little requirement for any further lateral mixing in view of the mixing that has already occurred during the coolant's longitudinal passage through the fuel assembly 10.

After securing the grids 18 and 20 to the thimbles 16, the lower end structure 14 is attached to the lower end portions of the thimbles 16. Each thimble 16 has a plug 87 and a plug extension 88 at its lower end. Each extension 88 is inserted into its associated hole previously drilled through transverse bar 58. Each plug 87 rests on its associated transverse bar 58; and the extension 88 is welded to the transverse bar 58, as indicated by reference character 90. The fuel rods 22 are then inserted through the grids 18 and 20 and are vertically supported either by the transverse bars 58 or by the periphery of the lower end nozzle 52 upon which the fuel rods 22 rest.

The top of the upper end structure 12 is next secured to the upper end portions of the thimbles 16, by welding the thimbles 16 to bushings 92 which have been previously inserted through upper end plate 26 and secured thereto. Thus, each thimble 16 is secured to the lower end structure 14, to each of the grids 18 and 20, and to the upper end structure 12. It is to be noted that the upper end structure 12 is spacedly positioned from the top of the fuel elements 22 in order to allow for differential thermal expansion between the thimbles 16 and the fuel rods 22. Furthermore, cross bars 28 overlie the top of the fuel elements 22 to prevent any possibility of the fuel elements 22 from moving in an upwardly direction more than a predetermined amount.

In summary, the thimbles 16, the grids 18 and 20, and the end structure 12 and 14 have been joined into a continuous structure having a high rigidity. Furthermore, the overall stiffness of the fuel assembly 10 is increased, when the fuel rods 22 are in place because of the friction generated between the fuel rods 22 and the lateral supporting means, for example the aforementioned six point lateral support.

It will be noted that great care has been taken to eliminate all edges on the outer periphery of the fuel assembly 10. This has been accomplished by chamfering all sharp edges, such as indicated by reference numerals 94 at the upper end structure 12 and 96 at lower end structure 14. Furthermore, there are no protrusions extending outwardly from the peripheral straps 62" on grids 18 and 20. In addition the straps 62" have upper mixing vanes 78a and lower peripheral vanes 80, which are bent inwardly and are used for guiding purposes when the fuel assembly 10 is inserted into a reactor core along side of adjacent fuel assemblies. To further prevent the possibility of fuel assembly engagement with an adjacent fuel assembly when inserted into the core, the peripheral straps 62" are provided with beveled edges 98 between adjacent upper mixing vanes 78 and also between adjacent lower peripheral vanes 80.

The rod cluster control assembly 36 comprises a drive shaft 100 to which is secured a multi-fingered spider 102. A cluster of neutron absorbing rods 14 have their upper end portions secured to the spider 102. Each neutron absorbing rod 104 is longitudinally aligned with and moves vertically in its own associated tubular guide thimble 16, the latter forming part of the fuel assembly 10. The neutron absorbing rods 104 are located in a symmetrical pattern within a single fuel assembly 10, and their associated guide thimbles 16 replace fuel rods 22 within the lattice of the fuel assembly 10. The guide thimbles 16 also have lateral openings 106, which allow coolant to enter the lower portion of each guide thimble and flow upwardly between the guide thimble 16 and its associated neutron absorbing rod 104 for cooling purposes and also for shock absorbing purposes during rapid emergency insertion of the control rod assembly. The drive shaft 100 is coupled to a control rod drive mechanism (not shown) mounted on the reactor vessel head (not shown) and is raised and lowered by the drive mechanism. Therefore, the entire cluster of neutron absorbing rods 104 move into and out of each fuel assembly 10 as a unit.

Most of the above mentioned components are made of a corrosion resistant metal such as stainless steel or a zirconium based alloy. The neutron absorbing rods 104, in this example, are made of silver-indium-cadmium alloy rods hermetically sealed in a "free standing" stainless steel tube.

One of the advantages of this invention is the fact that the rods are free to expand axially between the end structures of the fuel assembly, thereby largely eliminating thermal bowing due to differential expansion of the fuel rods which arises from power gradients across the fuel assembly. Another advantage of this invention is that there is no requirement for metallurgical bonding of the fuel cladding to the grid; therefore the fuel rods can use a zirconium base cladding, while the grids and other portions of the fuel assembly can be made out of stainless steel or any other suitable material. Still another advantage of this invention is the fact that the thimbles, grids and fuel elements cooperate to provide the mechanical strength and rigidity required for the fuel assembly thereby eliminating the need for any structural can around the fuel assembly. This results in a minimum of structural material within the fuel assembly and therefore reduces both the weight of the fuel assembly and the parasitic effect on neutrons. In addition, the elimination of the can reduces the pressure drop through the reactor core, increases the effective heat transfer within the reactor core, and makes it possible to obtain the same spacing between fuel rods of adjacent fuel assemblies as the spacing between fuel rods within the same assembly resulting in a substantially homogeneous reactor core. It will be further appreciated that the elimination of the peripheral can permits lateral mixing of coolant between adjacent fuel assemblies. Also, since a rod cluster control assembly need not be used with every fuel assembly in the reactor core, the tubular thimbles may be used for instrumentation purposes, such as irradiation of materials or neutron absorbers, when not used for the rod cluster control assembly. Furthermore, the fuel assemblies become interchangeable with each other whether used with or without a rod cluster control assembly.

Various modifications may be made within the spirit of the invention. For example, solid rods could be used in lieu of the thimbles. Also, fuel rods with a heavier cladding could be used as the elongated supporting means for the grids. Furthermore, an elongated rectangular structure may be substituted for a rod type supporting means.

Since numerous changes may be made in the above-described apparatus and different embodiments of the invention may be made without departing from the spirit thereof, it is intended that all matter contained in the foregoing description or shown in the accompanying drawings, shall be interpreted as illustrative and not in a limiting sense.

What is claimed as new is:

1. A fuel assembly for a nuclear reactor comprising:
   a plurality of fuel elements disposed in a parallel array;
   multiple hollow control rod guide tubes positioned in a predetermined pattern among said fuel elements;
   a plurality of grids of egg-crate configuration having openings therein through which said fuel elements and guide tubes extend for imparting lateral support thereto;
   said plurality of grids including top and bottom grids respectively located adjacent the top and bottom of said assembly, and at least one grid intermediate said top and bottom grids;
   said grids except said top and bottom grids including coolant mixing vanes thereon which impart a mixing action to coolant adapted to flow upwardly through the assembly;
   means securing each of said guide tubes to said grids;
   flow apertured plate means adjacent opposite ends of said fuel elements and guide tubes, said plate means at one end supporting said fuel elements and guide tubes and at the other end supporting said guide tubes;
   a common header holding multiple control rods designed for telescopic and longitudinal movement in the corresponding guide tubes.

2. The fuel assembly according to claim 1 wherein each of said grids includes multiple tabs shaped to the configuration of said guide tubes; and wherein
   said means securing each of said guide tubes to said grid comprises a weld made between each tab and its corresponding guide tube to provide a skeletal structure which permits longitudinal expansion and contraction of said fuel elements during reactor operation.

* * * * *